(12) United States Patent
Rasool

(10) Patent No.: US 10,097,883 B1
(45) Date of Patent: Oct. 9, 2018

(54) TEMPORALLY-SEAMLESS CHANNEL CHANGE FUNCTIONALITY DURING MULTICHANNEL STREAMING SESSIONS

(71) Applicant: SLING MEDIA PVT LTD, Bangalore (IN)

(72) Inventor: Mohammed Rasool, Bangalore (IN)

(73) Assignee: SLING MEDIA PVT. LTD., Bangaluru (IN)

( * ) Notice: Subject to any disclaimer, the term of this patent is extended or adjusted under 35 U.S.C. 154(b) by 0 days.

(21) Appl. No.: 15/605,394

(22) Filed: May 25, 2017

(51) Int. Cl.
*H04N 21/438* (2011.01)
*H04N 7/173* (2011.01)

(52) U.S. Cl.
CPC ..... *H04N 21/4383* (2013.01); *H04N 7/17345* (2013.01)

(58) Field of Classification Search
CPC ......... H04N 21/4532; H04N 21/44222; H04N 21/4668; H04N 5/44543; H04N 7/163; H04N 21/454; H04N 21/4667; H04N 21/482; H04N 21/4147; H04N 21/466; H04N 21/4826; H04N 21/6582
See application file for complete search history.

(56) References Cited

U.S. PATENT DOCUMENTS

| | | | |
|---|---|---|---|
| 7,895,624 B1* | 2/2011 | Thomas | H04N 5/4401 709/219 |
| 9,143,825 B2 | 9/2015 | Chittella | |
| 2003/0018973 A1* | 1/2003 | Thompson | H04H 60/40 725/47 |
| 2009/0083798 A1* | 3/2009 | Lee | H04H 60/64 725/46 |
| 2012/0284756 A1* | 11/2012 | Kotecha | H04L 65/4084 725/68 |

\* cited by examiner

*Primary Examiner* — Hsiungfei Peng
(74) *Attorney, Agent, or Firm* — Lorenz & Kopf, LLP

(57) ABSTRACT

Devices, systems, method, and program products are provided, which support temporally-seamless change functionalities during multichannel streaming sessions established between a streaming media server and a client media receiver. In embodiments, the method includes outputting, to a display device, a first streaming channel contained in a streaming channel bundle and assigned a high priority level. When receiving a channel change request to view a second streaming channel, the client media receiver monitors for additional channel change requests over a predetermined wait period. If an additional channel change request is received within the wait period, the client media receiver repeats the step of monitoring. Conversely, if an additional channel change request is not received with the wait period, the client media receiver sends a channel reprioritization command to the streaming media server to prioritize the second streaming channel over the first streaming channel in continued transmission of the streaming channel bundle.

20 Claims, 9 Drawing Sheets

Figure 1:
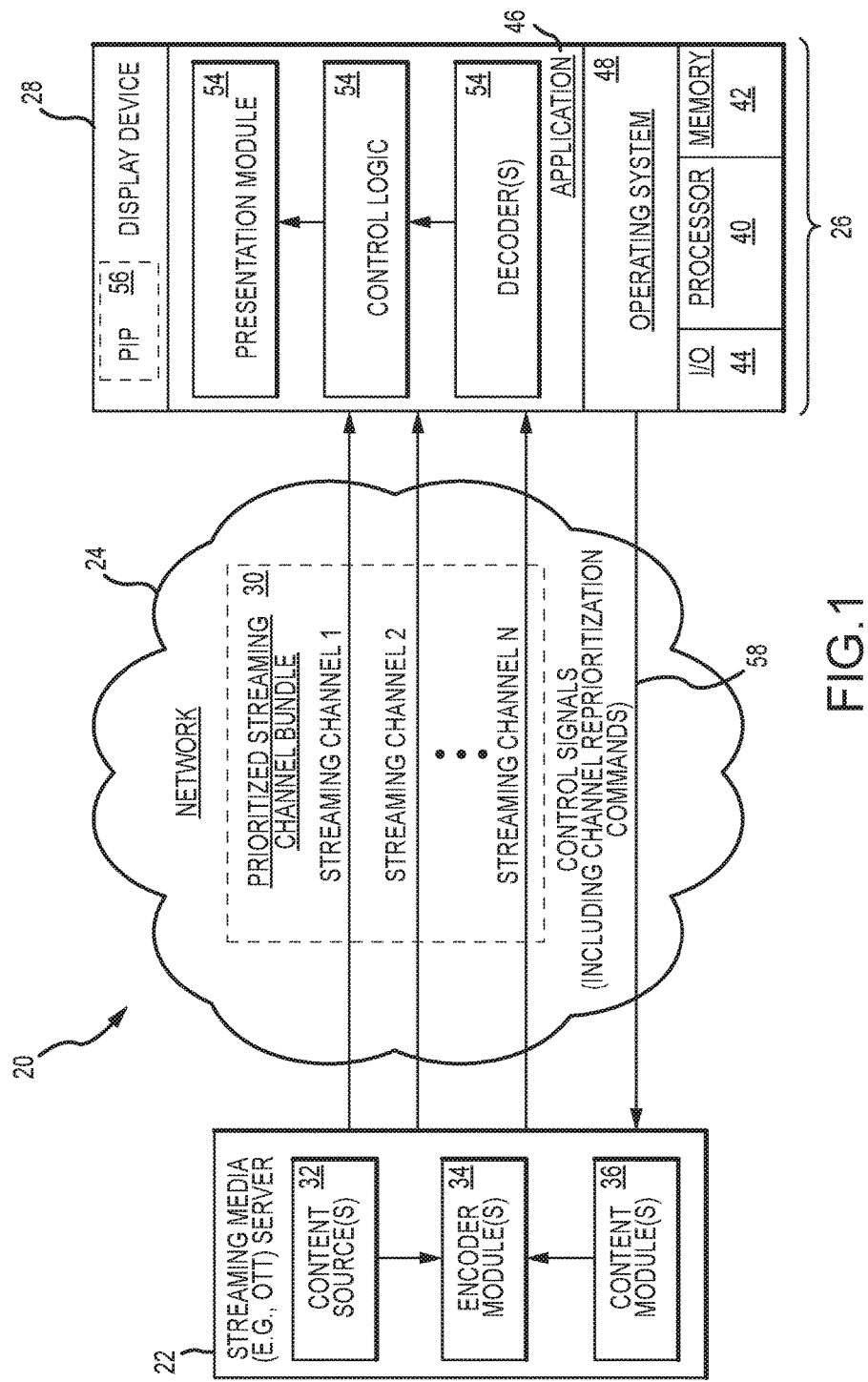

TEMPORALLY-SEAMLESS CHANNEL CHANGE FUNCTIONALITY DURING MULTICHANNEL STREAMING SESSIONS

TECHNICAL FIELD

The following disclosure generally relates to media streaming and, more particularly, to devices, methods, and program products enabling end users to change streaming channels, such as those provided during Over-The-Top (OTT) television streaming sessions, in a temporally-seamless manner.

BACKGROUND

The term "streaming media" generally refers to the reception of multimedia content, such as television programming and other audiovisual content, through a communications network at a bitrate enabling presentation of the content in real time as it is received. Streaming media may be viewed live or on-demand and provided by, for example, a pay Television (TV) provider, a Video-On-Demand (VOD) provider, or a remotely-controlled placeshifting device. In the case of VOD services, the media content may be stored in a pre-encoded format and distributed to a client media receiver, such as a mobile phone or Set-Top Box (STB), over a Content Delivery Network (CD N). In the case of placeshifted media, a digital video recorder (DVR), STB, or a similar device having placeshifting capabilities and located within a user's residence may encode and transmit selected streaming media to a client media receiver, such as a mobile phone or tablet, operated by the end user. Increasingly, a demand has arisen to provide such streaming content in a linear multichannel format as, for example, Over-The-Top (OTT) TV programming.

Ideally, multichannel streaming services mimic the familiar in-home viewing experience provided by legacy cable and satellite broadcast systems. However, network reliability issues, bandwidth constraints, latency effects, and other such limiting factors may negatively impact multichannel streaming services delivered through the Internet and similar communications networks. As a specific example, relatively prolonged delays or temporal lags can occur in implementing user-requested channel changes when streaming multichannel content to a mobile phone or other client media receiver. Depending upon dynamic network parameters, such as varying bandwidth constraints, the duration of such lags (as measured from input of the channel change request to presentation of the newly-requested streaming channel) can approach or exceed 10 seconds in certain instances. Such pronounced lags in executing channel change requests detracts from the viewing experience and may be frustrating to end users accustom to near instantaneous channel browsing (colloquially, "channel surfing") offered by traditional broadcast systems. As an additional drawback, prolonged channel browsing by an end user can result in the transmission of a needless series of channel change requests to the streaming media server, which consumes network bandwidth and increases server processing demands.

It is thus desirable to lessen, if not eliminate lags in implementing end user request to change streaming channels during multichannel streaming sessions. Similarly, it is desirable to better utilize network bandwidth capacity and alleviate media server processing loads in multichannel streaming environments by, for example, reducing excessive channel change requests generated by a client media receiver when an end user engages in prolonged channel browsing or "channel surfing" behaviors. The following describes devices, systems, methods, and program products providing such desirable features and characteristics. Other desirable features and characteristics will become apparent from the subsequent detailed description and the appended claims, taken in conjunction with the accompanying drawings and this background section.

BRIEF SUMMARY

Methods carried-out by client media receivers during multichannel streaming sessions are provided. In one embodiment, the method includes receiving, at the client media receiver, a prioritized streaming channel bundle containing streaming channels assigned varying priority levels. The streaming channel bundle may contain, for example, Over-The-Top (OTT) linear television programming. The client media receiver outputs, to a display device associated with the client media receiver, a first streaming channel contained in the streaming channel bundle and assigned a high priority level. Subsequently, the client media receiver receives a user channel change request to view a second streaming channel, which is further contained in the prioritized streaming channel bundle and assigned a priority level lower than the first streaming channel. In response to receipt of the user channel change request, the client media receiver monitors for additional user channel change requests over a predetermined time threshold or wait period commencing upon receipt of the user channel change request. If an additional user channel change request is received within the predetermined wait period, the client media receiver repeats the step of monitoring. Conversely, if an additional channel change request is not received with the predetermined wait period, the client media receiver sends a channel reprioritization command to the streaming media server to prioritize the second streaming channel over the first streaming channel in continued transmission of the prioritized streaming channel bundle.

In further implementations, the client media receiver may output a recorded segment of the second streaming channel if a live stream of the second streaming channel is not currently provided to the client media receiver as part of the prioritized streaming channel bundle. The client media receiver may store the recorded segment of the second streaming channel in a memory accessible (e.g., contained within or operably coupled to) to the client media receiver, and repeatedly update the recorded segment to contain more timely content from the second streaming channel when second streaming channel is provided to the client media receiver, while limiting a length of the recorded segment to a predetermined duration. In such embodiments, the client media receiver may vary the predetermined duration of the recorded segment in response to changes in network latency of the communications network. Similarly, the client media receiver may reduce the predetermined duration as the storage capacity of the memory is increasingly filled. Additional recorded segments may also be captured for other streaming channels included in the channel bundle. When the time position of the second streaming channel is delayed relative to a time of live streaming due to presentation of the recorded segment, the client media receiver may provide the end user with an option to advance to the time of live streaming, while the end user continues to view content from the second streaming channel.

In another embodiment, the method includes receiving, at a client media receiver, a prioritized streaming channel bundle containing streaming channels assigned differing priority levels. The client media receiver outputs, to a display device associated with the client media receiver, a first streaming channel contained in the streaming channel bundle. When a user channel change request to view a second streaming channel contained in the prioritized streaming channel bundle is received at the client media receiver, the client media receiver outputs to the display device: (i) a live stream of the second streaming channel if currently provided to the client media receiver as part of the prioritized streaming channel bundle; and (ii) a recorded segment of the second streaming channel if a live stream of the second streaming channel is not currently provided to the client media receiver. The recorded segment of the second streaming channel can be, for example, a recently recorded clip of a particular duration (e.g., several second to several minutes) of the second streaming channel, which is stored in cache memory and which is repeatedly overwritten or updated to contain content from the second streaming channel most recently received by the client media receiver.

Embodiments of a client media receiver are further provided. The client media receiver may be utilized in conjunction with a display device, a streaming media server, and a communications network enabling bidirectional communication between the client media receiver and the streaming media server. In various embodiments, the client media receiver includes a processor and a computer-readable storage medium, which stores a computer-executable code. When executed by the processor, the computer-executable code causes the client media receiver to perform the operations of: (i) receiving a prioritized streaming channel bundle transmitted over the communications network by the streaming media server; (ii) outputting to the display device a first streaming channel contained in the prioritized streaming channel bundle; (iii) receiving a user channel change request to view a second streaming channel contained in the prioritized streaming channel bundle; (iv) monitoring for an additional channel change request within a predetermined wait period commencing upon receipt of the user channel change request; and (v) if an additional user channel change request is not received within the predetermined wait period, transmitting a channel reprioritization command to the streaming media server to prioritize the second streaming channel over the first streaming channel in continued transmission of the prioritized streaming channel bundle. In certain implementations, the computer-executable code may further cause the client media receiver to repeat the operation of monitoring if an additional user channel change request is received within the predetermined wait period.

The methods set-forth above and described elsewhere in this document can be implemented utilizing complementary program products, such as software applications executed on suitably-equipped client media receivers and streaming media servers. Various additional examples, aspects, and other useful features of embodiments of the present disclosure will also become apparent to one of ordinary skill in the relevant industry given the additional description provided below.

BRIEF DESCRIPTION OF THE DRAWING FIGURES

Figure 2:
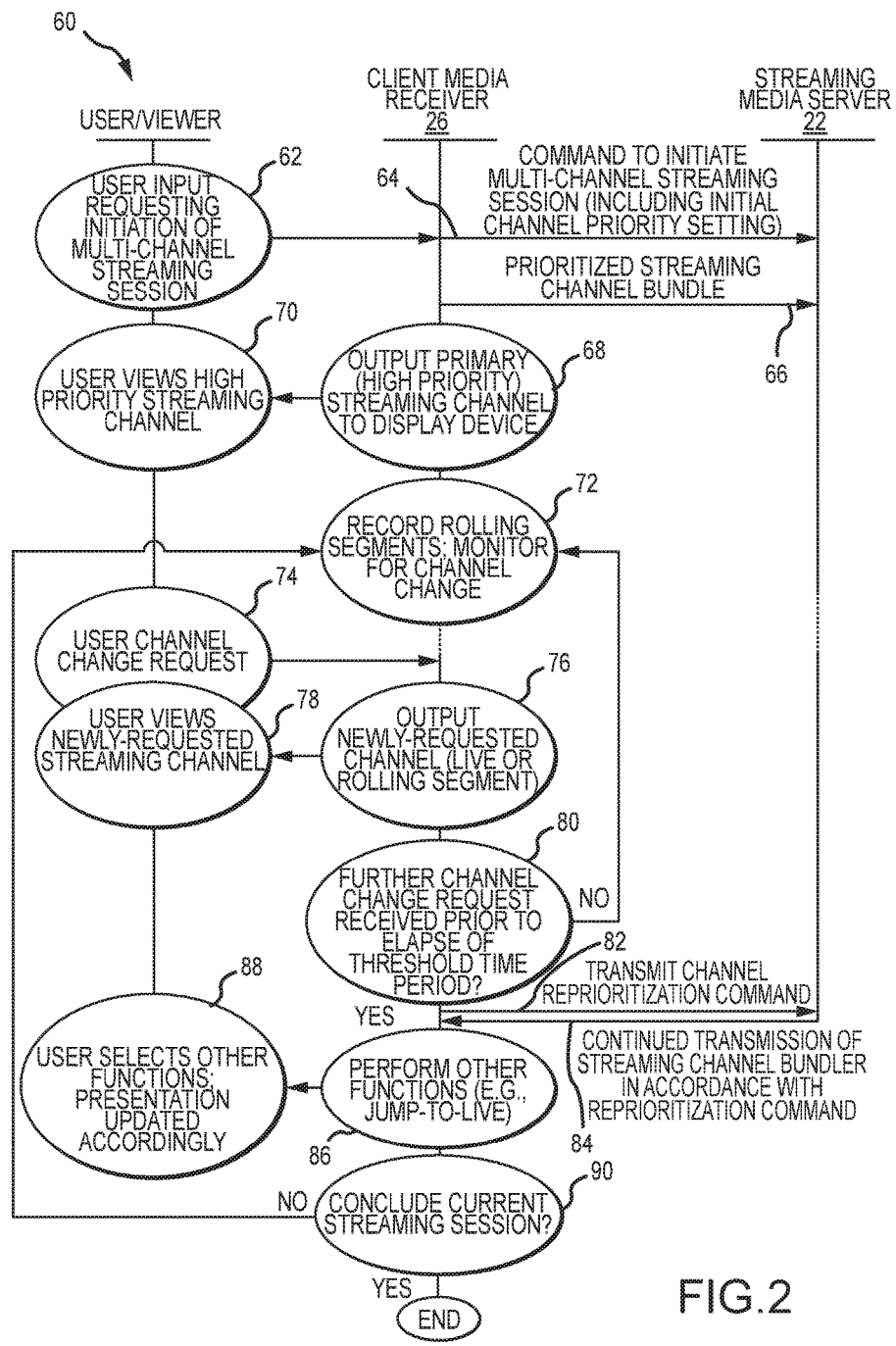

Exemplary embodiments will hereinafter be described in conjunction with the following drawing figures, wherein like numerals denote like elements, and:

FIG. 1 is a schematic illustrating a prioritized multichannel streaming session established between a streaming media server and a client media receiver, such as a user-operated mobile phone or set-top box, as illustrated in accordance with an exemplary embodiment of the present disclosure;

FIG. 2 is a message timing diagram of an exemplary transmission sequence between the streaming media server and the client media receiver illustrated in FIG. 1 during a prioritized multichannel streaming session; and FIGS. 3-9 schematically illustrate different exemplary scenarios in which the client media receiver reacts to user channel change requests and selectively transmits channel reprioritization commands to the streaming media server, as appropriate, to provide a temporally-seamless channel change experience to the end user.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

The following describes devices, systems, methods, and program products enabling temporally-seamless change functionalities during a multichannel streaming session established between a streaming media server and a client media receiver. Upon initialization of a given multichannel streaming session, the streaming media server transmits to the client media receiver a streaming channel bundle. The streaming channel bundle contains multiple streaming channels, at least one of which is initially designated as a "primary" streaming channel and others of which are initially designated as "secondary" streaming channels. The particular channels identified as the primary and secondary streaming channels may be varied by the client media receiver in accordance with user input and other factors. The streaming channel currently viewed by the end user will typically be identified as the "primary" streaming channel, at any given time, although this may not be the case during channel browsing when one or more secondary channels are briefly presented in a transitory manner. The streaming media server usefully ensures that the high priority primary streaming channel is encoded and transmitted to the client media receiver in a substantially continuous or non-interrupted manner and at an optimal quality during the multichannel streaming session, absent severe bandwidth constraints. In contrast, the lower priority secondary channels may be transmitted intermittently by the streaming media server and/or the quality of the secondary channels may be selectively reduced during the multichannel streaming session to, for example, accommodate variations in communications network bandwidth or other limiting resources.

In embodiments, the client media receiver monitors for channel change requests generated by an end user during a given multichannel streaming session. Upon receipt of a user channel change request, the client media receiver presents a live stream of the requested streaming channel if available as a part of the streaming channel bundle. If a live stream of the requested streaming channel is presently unavailable to the receiver, the client media receiver may instead present a recently-recorded segment of the newly-requested streaming channel, as stored in a memory contained in or otherwise associated with and accessible by the client media receiver. When appropriate, the client media receiver may also transmit instructions to the streaming media server to provide a live stream of the newly-requested streaming channel. The live stream of the newly-requested streaming channel may be appended to the recorded segment prior to elapse of the segment to avoid any discontinuity in presentation of the streaming channel to the end user. In certain embodiments, the client media receiver may also request and receive a historical gap fill segment spanning a time period from the conclusion of the recorded segment to the time of live streaming. In this manner, content from any requested streaming channel for which recorded segments are repeatedly (continually or periodically) stored by the client media receiver can be presented to the end user in an essentially instantaneous manner. Temporally-seamless channel browsing is thus supported in a multichannel streaming environment. This is highly desirable.

Different prioritization hierarchies may be utilized to classify or categorize the streaming channels contained in the streaming channel bundle. In certain instances, a relatively simple, two tier hierarchy may be employed such that the primary streaming channel is assigned the highest possible priority ranking, while the remaining secondary channels are assigned lower priority rankings. In other implementations, hierarchies containing more than two tiers may be employed; e.g., certain secondary channels may be assigned intermediate priority levels based upon relevancy to the content of the primary streaming channel, predicted likelihood of future selection by the end user, numerical proximity (in channel number) to the primary streaming channel, and other such factors. Regardless of the complexity of the channel priority ranking scheme, the streaming media server usefully references the priority ranking in determining bandwidth allocations between the streaming channels. As generally indicated above, the streaming media server may allocate available bandwidth in a manner ensuring substantially continuous encoding and transmission of the primary streaming channel at an optimal quality level, to the extent possible. Comparatively, those secondary streaming channels assigned lower priority levels may be selectively encoded and transmitted to the client media receiver at lower qualities and/or in an intermittent (e.g., temporally-staggered) manner, as dictated by changing bandwidth constraints and with due consideration given to any variance in priority rankings between the secondary streaming channels.

In various embodiments, the client media receiver may selectively transmit channel reprioritization commands to the streaming media server during multichannel streaming sessions. Issuance of the channel reprioritization commands can be based, at least in part, on user channel change requests received at the client media receiver. For example, after receiving a user channel change request, the client media receiver may await the elapse of a predetermined time threshold or wait period before transmitting a channel reprioritization command to the streaming media server. In this case, countdown of the channel change wait period may commence upon receipt of a user channel change request and begin anew should an additional user channel change request be received prior to elapse of the channel change wait period. Through the implementation of such a channel change wait period in combination with the above-described streaming channel prioritization scheme, the transmission of needless or superfluous channel change requests or reprioritization commands from the client media receiver to the streaming media server can be minimized. This, in turn, alleviates server processing loads and helps optimize network bandwidth allocations during multichannel streaming sessions.

Embodiments of the multichannel streaming devices, systems, methods, and program products described herein may provide other useful functionalities in addition to or in lieu of those set-forth above. Such other functionalities may include, but are not limited to, the provision of a "jump-to-live" option when a temporal delay or lag is imparted to currently-viewed streaming channel by virtue of the presentation of recently-recorded segment of the streaming channel. Additionally or alternatively, the client media receiver may enable an end user to transition from live multichannel viewing to Video On Demand (VOD) consumption by, for example, automatically downloading one or more additional episodes of an episodic series when an episode of the series is currently being viewed by the end user on the primary streaming channel. The client media receiver may then provide corresponding prompts at a designated trigger event (e.g., after conclusion of the currently-viewed episode) to determine whether the end user would like to view any additional episodes of the series as VOD programming. Exemplary embodiment of devices, systems, methods, and program products providing such useful functionalities will now be described in conjunction with FIGS. 1-9.

FIG. 1 schematically illustrates a multichannel streaming system 20, which may conduct a prioritized multichannel streaming session and which is depicted in accordance with an embodiment of the present disclosure. In the illustrated example, multichannel streaming system 20 includes a streaming media server 22, a client media player or receiver 26, and a display device 28. During operation of multichannel streaming system 20, bidirectional communication between streaming media server 22 and client media receiver 26 occurs through a communications network 24, while client media receiver 26 outputs video (and possibly audio) signals over a wired or wireless connection to display device 28. The foregoing components can each be implemented utilizing any suitable number and combination of known devices including microprocessors, memories, power supplies, storage devices, interface cards, and other standard components. Such components may include or cooperate with any number of software programs or instructions designed to carry-out the various methods, process tasks, encoding and decoding algorithms, and relevant display functions described herein. Multichannel streaming system 20 may also contain other conventionally-known components, which are not shown in FIG. 1 to avoid unnecessarily obscuring the drawing.

During a multichannel streaming session, streaming media server 22 transmits a prioritized streaming channel bundle 30 through communications network 24 to client media receiver 26. The term "streaming channel bundle," as appearing herein, refers to a streaming data transmission containing multiple channels, regardless of the particular revenue model employed (if any) and regardless of whether certain channels in the bundle are provided in an interrupted manner or as a discontinuous component stream (as may occur for certain secondary channels in the bundle, as explained more fully below). In embodiments, streaming channel bundle 30 contains Over-The-Top (OTT) linear television (TV) programming. Streaming channel bundle 30 is "prioritized" in that varying priority levels or rankings are assigned to the streaming channels contained in bundle 30. These priority levels may be assigned and repeatedly reassigned or adjusted by client media receiver 26 during a multichannel streaming session. In certain cases, streaming media server 22 may also adjust the priority levels assigned to the streaming channels contained in bundle 30. Such a channel prioritization hierarchy is usefully referenced by streaming media server 22 in allocating available bandwidth between the streaming channels within bundle 30. While only three streaming channels are schematically shown in FIG. 1, prioritized streaming channel bundle 30 can contain any practical number of streaming channels greater than one. This is emphasized in FIG. 1 by the labeling of the lower most channel stream as "streaming channel n" and the ellipsis symbol vertically separating streaming channel n from streaming channel 2.

With continued reference to FIG. 1, streaming media server 22 can assume the form of any device, system, or component suitable for obtaining content from one or more content sources 32, encoding the content utilizing one or more encoder modules 34 under the command one or more control modules 36, and transmitting the encoded content to client media server 22 over communications network 24. As generically shown in FIG. 1, modules 34, 36 can be implemented utilizing software, hardware, firmware, and combinations thereof. The encoded channel streams will often contain both video and audio component streams, which may be combined with other streaming data including packet identification data. Any currently-known or later-developed packetized format can be employed by streaming media sever 22 including, but not limited to, MPEG, QUICKTIME, WINDOWS MEDIA, and/or other formats suitable for transmission over communications network 24. In one implementation, client media server 22 functions as an OTT server, which provides streaming channel bundle 30 to client media receiver 26 as a subscription-based streaming OTT linear TV service.

Generally, communications network 24 may encompass any number of digital or other networks enabling multiple nodes (e.g., devices 22, 26) to communicate using any common protocols and signaling schemes. Communications network 24 can include one or more open Content Delivery Networks (CDNs), Virtual Private Networks (VPNs), the Internet, and various other communications networks implemented in accordance with TCP/IP protocol architectures or other conventional protocols. In various embodiments, network 24 may further encompass one or more wired or wireless local area networks (LANs), wide area networks (WANs), cellular networks, and/or any other pubic or private networks. Communications network 24 as illustrated in FIG. 1, then, is intended to broadly encompass any communications network(s), systems, or architectures for transmitting data between the various components of multichannel streaming system 20.

Client media receiver 26 can be any device, system, player, or the like suitable for performing the processes described herein. A non-exhaustive list of such devices includes mobile phones, laptop computers, desktop computers, gaming consoles, tablets, Digital Video Recorders (DVRs), and Set-Top Boxes (STBs). When engaged in a multichannel streaming session, client media receiver 26 outputs visual signals for presentation on display device 28. Display device 28 can be integrated into client media receiver 26 as a unitary system or electronic device. This may be the case when receiver 26 assumes the form of a mobile phone, tablet, laptop computer, or similar electronic device having a dedicated display screen. Alternatively, display device 28 can assume the form of an independent device, such as a freestanding monitor or television set, which is connected to client media receiver 26 (e.g., a gaming console, DVR, STB, or similar peripheral device) via a wired or wireless connection. Video output signals generated by client media receiver 26 may be formatted in accordance with conventionally-known standards, such as S-video, High-Definition Multimedia Interface (HDMI), Sony/Philips Display Interface Format (SPDIF), Digital Visual Interface (DVI), or IEEE 1394 standards.

Client media receiver 26 may contain a processor 40 configured to selectively execute software instructions, in conjunction with associated memory 42 and conventional Input/Output (I/O) features 44. I/O features 44 can include a network interface, an interface to mass storage, an interface to display device 28, and/or various types of user input interfaces. Client media receiver 26 may execute a software program or application 46 directing the various hardware features of client media receiver 26 to perform the functions described herein. Application 46 suitably interfaces with processor 40, memory 42, and I/O features 44 via any conventional operating system 48 to provide such functionalities. Software application can be a placeshifting application in embodiments in which streaming media server 22 assumes the form of a STB, DVR, or similar electronic device having placeshifting capabilities and, in many cases, located within the residence of an end user. In certain implementations, client media receiver 26 may be realized utilizing special-purpose hardware or software, such as the SLINGCATCHER-brand products available from Sling Media, Inc., presently located in Foster City, Calif.

As schematically shown in FIG. 1, application 46 suitably includes control logic 50 adapted to process user input, obtain prioritized streaming channel bundle 30 from one or more content sources 32, decode received streams, and supply corresponding output signals to display device 28. The streaming channels contained in prioritized streaming channel bundle 30 are decoded utilizing known techniques. In implementations, each channel stream contained in bundle 30 may be simultaneously decoded by a separate decoding modules. The decoding module or modules may be implemented using specialized hardware or software executing on processor 40. Decoded programming can be provided to a presentation module 54, which then generates output signals to display device 28. In some embodiments, presentation module 54 may combine decoded programming from multiple streaming channels to create a blended or composite image; e.g., as schematically indicated in FIG. 1, one or more PIP images 56 may be superimposed over a main or primary image generated on a screen of display device 28.

In operation, control logic 50 of client media receiver 26 obtains programming in response to end user inputs received at I/O features 44 of receiver 26. Control logic 50 may establish a control connection with remote streaming media server 22 via communications network 24 enabling the transmission of commands from control logic 50 to control module 36. Streaming media server 22 may operate by responding to commands received from a client media receiver 26 via network 24, as indicated in FIG. 1 by arrow 58. Such commands may include information utilized to initiate a multichannel streaming session with streaming media server 22 possibly including data supporting mutual authentication of server 22 and receiver 26. When streaming media server 22 assumes the form of a consumer placeshifting device, such as a STB or DVR located in an end user's residence, control commands 58 may include instructions to remotely operate the placeshifting device. Control commands 58 may also contain channel reprioritization commands selectively transmitted from client media receiver 26 to streaming media server 22 during a prioritized multichannel streaming session, as described more fully below in conjunction with FIG. 2.

FIG. 2 is a message timing diagram of a multichannel streaming process 60 illustrated in accordance with an exemplary embodiment of the present disclosure. Exemplary process 60 may be carried-out by streaming media server 22 and client media receiver 26 during a prioritized multichannel streaming session to provide a temporally-seamless channel change experience to an end user. Process 60 commences with receipt of user input requesting initialization of a multichannel streaming session (FUNCTION 62, FIG. 2). Such a user request can be entered by an end user into client media receiver 26 utilizing a user input interface (e.g., a keyboard, pointer device, touchscreen, scroll wheel, voice command system, remote control, etc.) included within I/O features 44 (FIG. 1) or otherwise operably coupled to media receiver 26. Client media receiver 26 recognizes this user request and transmits a corresponding command to initiate a multichannel streaming session to streaming media server 22 (TRANSMISSION 64, FIG. 2). This command may include information identifying an initial channel priority setting or hierarchy assignment, which client media receiver 26 may recall from memory 42 (FIG. 1). One way or two way authentication processes can also be performed, as desired.

The prioritization of the streaming channels contained in bundle 30 may be determined by client media receiver 26 and communicated to streaming media server 22 via the initial streaming channel priority setting included in TRANSMISSION 64 (FIG. 2) and subsequent channel reprioritization commands as contained in below-described TRANSMISSION 82 (FIG. 2). Streaming media server 22 may also be permitted to adjust the streaming channel priority ranking in embodiments, although any such adjustments by server 22 will typically be subservient to channel priority ranking commands received from client media receiver 26. Client media receiver 26 may assign the highest priority level to a streaming channel initially presented to the end user in an embodiment. In the absence of user input specifying a particular channel with which to begin the newly-initiated multichannel streaming session, client media receiver 26 may assign the highest priority level to the channel last presented to the end user during the previous multichannel streaming session.

In certain implementations, a two tier hierarchy may be employed in prioritizing the streaming channels such that the primary streaming channel is assigned the highest priority ranking, while the secondary streaming channels are assigned a lower priority ranking. In other embodiments, the priority hierarchy may contain more than two tiers such that one or more additional channels may be assigned a moderate priority level based upon any number of specified criteria. Such criteria may be based upon the content of the secondary streaming channels; e.g., whether the additional channels currently provide coverage of live events and/or the relatedness of the additional channels to the content currently presented on the primary streaming channel. Additionally or alternatively, the predicted likelihood of the end user requesting a channel change to the secondary channels may be considered; e.g., based upon a user profile created from past viewing habits and/or user input specifying preferences. As a first example, the primary streaming channel may be assigned the highest priority ranking, those channels frequently viewed by the end user may be assigned a moderate priority ranking, and all other channels included in streaming channel bundle 30 may be assigned a lower priority ranking. In other embodiments, those channels featuring live events, such as live sporting events, breaking news, or a live broadcast of a presidential address, may be assigned a moderate or intermediate priority level. As still further possibility, those channels immediately above or below the primary streaming channel by channel number, and thus more likely to be selected by a user when sequentially scrolling through the streaming channels contained in bundle 30, may be assigned a moderate priority level. Various other approaches can also be utilized.

In response to streaming session initialization, streaming media server 22 transmits streaming channel bundle 30 (FIG. 1) to client media receiver 26 over communications network 24 (TRANSMISSION 66, FIG. 2). Streaming media server 22 may encrypt streaming channel bundle 30 in its entirety, encrypt selected channels in bundle 30, or may not employ encryption. As previously noted, prioritized streaming channel bundle 30 contains at least one channel identified as a primary streaming channel (e.g., the streaming channel viewed by the end user over a current or recent time period in a non-transitory manner) and any number of additional channels identified as secondary streaming channels. Depending upon bandwidth constraints and other such factors, the secondary streaming channels (and, in certain circumstances, the primary streaming channel) may be provided at lower quality levels (e.g., lower frame rates and/or image resolutions) and/or provided intermittently, as described below in conjunction with FIGS. 3-9. Upon or immediately after initial reception of prioritized stream channel bundle 30, client media receiver 26 performs the appropriate process tasks (e.g., decoding and decryption) and outputs signals corresponding to primary streaming channel to display device 28 for presentation to the end user (FUNCTION 68, FIG. 2). The end user may then view the primary streaming channel on the screen of display device 28 (ACTION 70, FIG. 2).

Client media receiver 26 continually monitors for channel change requests during the multichannel streaming session (FUNCTION 72, FIG. 2). Client media receiver 26 may also record and repeatedly rerecord segments of one, a subset of, or possibly all secondary channels contained in prioritized streaming channel bundle 30 (FIG. 1). The recorded segments may be stored in memory 42 as cached clippings of the relevant channels. The recorded segments may be referred to as "rolling recorded segments" or having "rolling start times" as each segment is updated on a repeated basis utilizing recently received content from each streaming channel extending into the past by a predetermined or set duration, which may be several seconds to several minutes from the time of live streaming ($T_{LS}$, described below). The duration of the rolling recorded segments may vary among implementations and may be tailored to suit a particular application based upon, for example, storage capacity and availability, client or server response time, the length of the below-described channel change wait period, and other such factors. The duration of the recorded segments may be fixed or may be varied by client media receiver 26 in accordance with changes in one or more monitored parameters, such as network latency. For example, client media receiver 26 may shorten the duration of the recorded segments in conjunction with decreasing network latencies, decreasing memory availability (as may occur as receiver storage capacity becomes increasingly filled), and/or other such factors.

When receiving a user channel change request for a streaming channel for a which live stream is not presently available, client media receiver 26 may present the corresponding recorded rolling segments or cached clips to the end user. This provides the end user with content from the requested streaming channel, while a live stream of the newly-requested channel is obtained from streaming media server 22 (absent receipt of a further user channel change request within the below-described channel change wait period). In effect, a tradeoff is leveraged, which introduces a modest time-shift or delay in the time position at which content from the newly-requested streaming channel is presented, as measured relative to the time of live streaming ($T_{LS}$). Through this tradeoff, a non-interrupted or continuous viewing experience is provided in a multichannel streaming environment, while accommodating channel change requests for streaming channels for which live streams are not immediately available to client media receiver 26.

When a user channel change request is received at client media receiver 26 (ACTION 74, FIG. 2), client media receiver 26 outputs the newly-requested streaming channel to display device 28 accordingly (FUNCTION 76, FIG. 2). As previously indicated, client media receiver 26 may present a live stream of the newly-requested streaming channel if such a live stream is currently provided to media receiver 26 as part of prioritized streaming channel bundle 30. Alternatively, client media receiver 26 may present the recorded segment of the newly-requested streaming channel if a live stream of the channel is not currently available. In either event, content from the newly-requested streaming channel is outputted to display device 28 and thus presented for immediate viewing by the end user (ACTION 78, FIG. 2).

Immediately following or concurrently with FUNCTION 76 (FIG. 2), client media receiver 26 begins monitoring for the receipt of additional channel change commands over the channel change wait period. The channel change wait period is essentially an assuredness mechanism utilized to determine with a higher confidence level that a given streaming channel is likely to be selected or settled upon by the end user for prolonged viewing. For a given iteration, countdown of the channel change wait period commences upon receipt the last channel change request received form the end user (FUNCTION 80, FIG. 2). If an additional channel change request is received within the channel change wait period, client media receiver 26 returns to FUNCTIONS 72, 76, as described above; receiver 26 outputs the newly-requested streaming channel and recommences monitoring for further channel change requests for a new iteration of the channel change wait period. The generation of excessive channel change requests or reprioritization commands by client media receiver 26 is consequently minimized, if not largely eliminated. In certain embodiments, the channel change wait period may have a fixed value on the order of, for example, 1 to 30 seconds. In other embodiments, the channel change wait period may be dynamic and adjusted based upon one or more parameters, such as past end user behavior when channel browsing during previous multichannel streaming sessions.

If an additional channel change request is not received within the channel change wait period, client media receiver 26 transmits a channel reprioritization command to streaming media server (TRANSMISSION 82, FIG. 2). The channel reprioritization command may identify the streaming channel last requested by the end user (and typically currently presented on display device 28 (FIG. 1)) as the primary streaming channel, which is then assigned the highest priority ranking. The channel change reprioritization command may contain information identify the current priority ranking to each of the streaming channels contained within bundle 30, as assigned by receiver 26. Any historical gap fill segment, as required to ensure continuity in the presentation of content from a requested streaming channel, may also be requested in conjunction with the channel reprioritization command. Additional description in this regard is provided below conjunction with FIGS. 7-9. The prioritization ranking of the secondary streaming channels may also be adjusted at this juncture. For example, if the newly-selected primary streaming channel is presently covering a sporting event (e.g., a particular college basketball game), the secondary streaming channels depicting other similar sporting events (e.g., other concurrently-broadcast college basketball games) may be assigned a moderate or high priority level by client media receiver 26 as part of transmission 82 or, perhaps, by streaming media server 22 when receiving transmission 82. Streaming media server 22 then continues transmission of streaming channel bundle 30 (FIG. 1) in accordance with the newly-received reprioritization instructions (TRANSMISSION 84, FIG. 2).

In some embodiments, client media receiver 26 may provide additional functionalities during process 60, as indicated in FIG. 2 at FUNCTION 86. Such other functions may include the ability to advance to the live streaming when time position of a streaming channel is delayed relative to the time of live streaming due to presentation of stored video segments to the end user in the absence of a live stream. An example of such a jump-to-live function is described below in conjunction with FIG. 9. Additionally or alternatively, client media receiver 26 may permit an end user to transition from live multichannel streaming to VOD viewing in certain instances. For example, client media receiver 26 may automatically (that is, without requiring additional user input) download additional episodes of a series presently viewed by the end user. Client media receiver 26 may provide user prompts through an on-screen Graphical User Interface (GUI) and adjust the video output, as appropriate, to carry-out such additional features (ACTION 88). Afterwards, client media receiver 26 determines whether the current streaming session should continue (FUNCTION 90, FIG. 2). If determining that the current streaming session should be continued, client media receiver 26 returns to FUNCTION 72 and the above-described process repeats. If, instead, determining that the current streaming session should conclude, client media receiver 26 progresses to FUNCTION 92 and terminates the current multichannel streaming session.

Turning now to FIGS. 3-9, several exemplary scenarios are depicted in which client media receiver 26 selectively implements user channel change requests and transmits corresponding channel reprioritization commands to streaming media server 22. For consistency with FIG. 1, client media receiver 26 is illustrated as receiving three content streams corresponding to channels 1, 2, and n, as generically represented by graphics 100, 102, and 104, respectively. However, as previously indicated, any number of streaming channels can be contained in streaming channel bundle 30. The horizontal axis in FIGS. 3-9 represents a time frame encompassing the time position of live streaming or "$T_{LS}$" (that is, the time position at which the streaming programming appears when presented in real time as received by client media receiver 26), as well as the rolling start time for any recorded segments ($T_{RS\_S}$). The rolling end time position for the recorded segments will typically be concurrent with $T_{LS}$; it is, however, possible for the end time for one or more of the recorded segments to extend into the future beyond $T_{LS}$ when such future content is available. In this regard, and as indicated in FIGS. 3-9, future content (that is, content extending forward in time relative to $T_{LS}$) may be available for one or more of the secondary streaming channels when the content presented on such channels has previously been created and is accessible by receiver 26; e.g., as may be the case when the streamed content is a preexisting movie, an episode of an ongoing series, or other such content. Finally, as appearing at multiple locations in FIGS. 3-9, graphic 106 indicates the time position of the streaming channel currently outputted by client media receiver 26 to display device 28.

Figure 3:
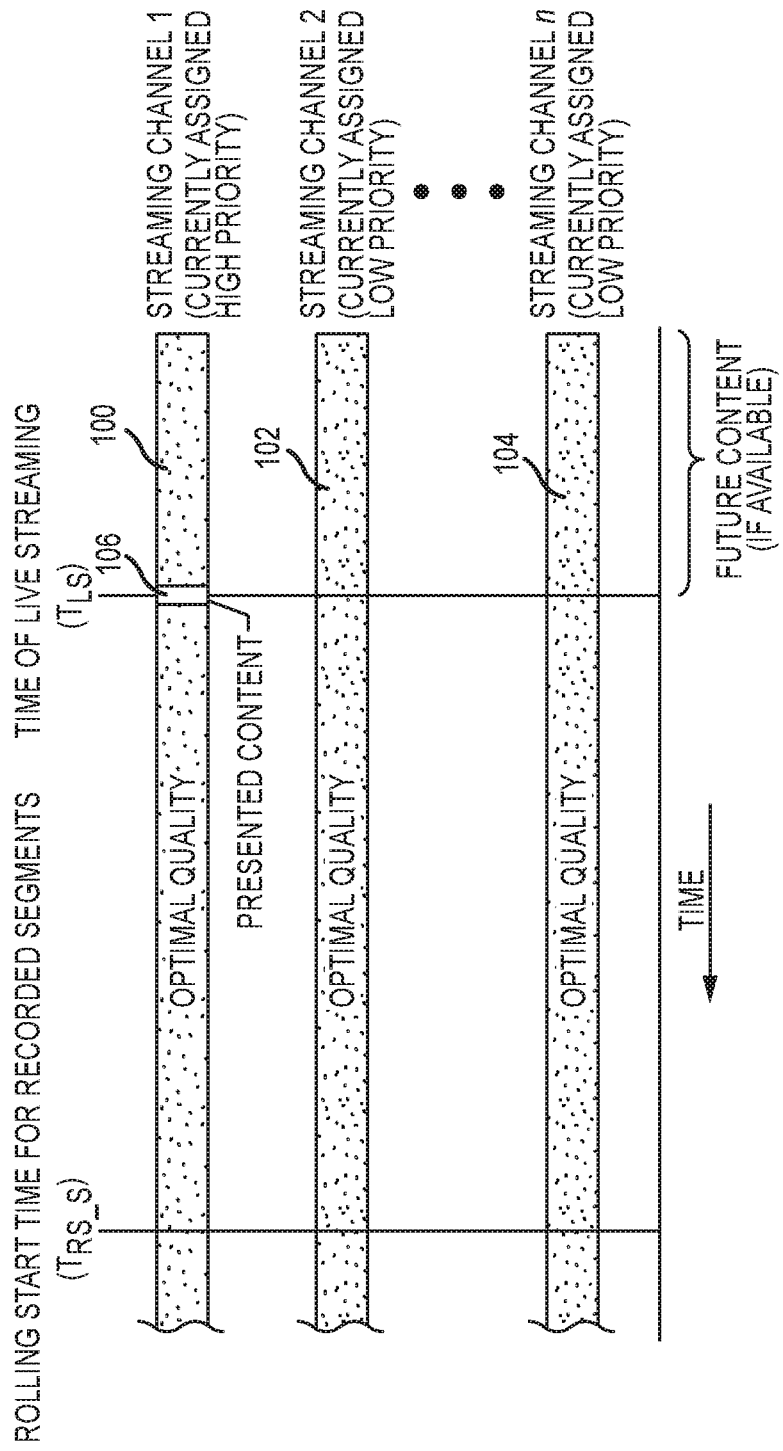
Figure 4:
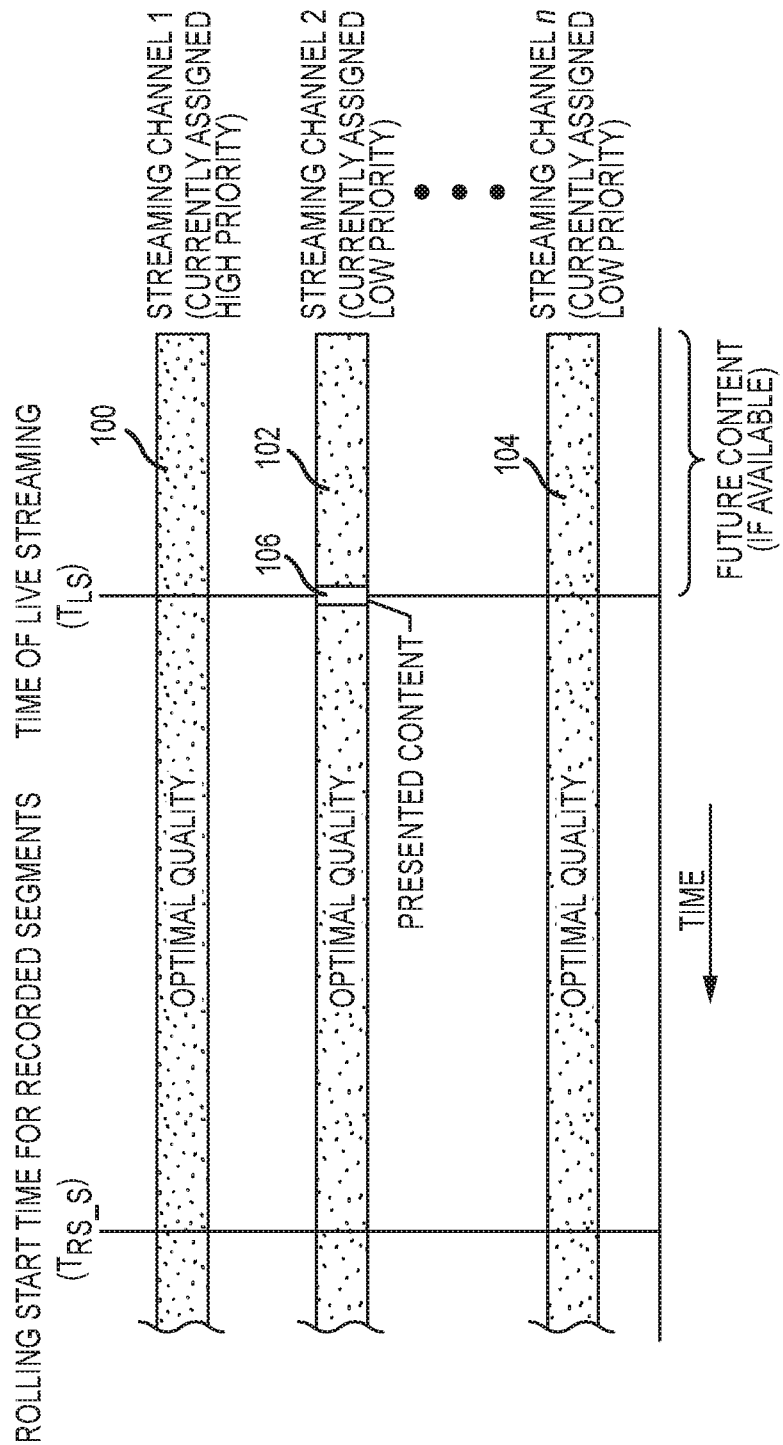

With initial reference to FIGS. 3-4, a first exemplary scenario is presented under idealized bandwidth conditions in which all applicable streaming channels are received continuously, concurrently, and at optimal quality. Addressing specifically FIG. 3, the exemplary scenario is depicted prior to receipt of a user channel change request by client media receiver 26. As indicated by the positioning of graphic 106, client media receiver 26 presently outputs a live stream of streaming channel 1, which is identified as the primary streaming channel assigned the highest priority level in this example. Under such conditions, client media receiver 26 implements user channel change requests by altering the output signal to display device 28 to depict any newly-selected channel stream at essentially the same time as the channel change request is received at receiver 26. This may be appreciated by comparing FIG. 3 to FIG. 4, which further illustrates the first exemplary scenario after receipt of a user request to change to presentation of streaming channel 2. As streaming channel 2 is immediately available at an optimal quality to client media receiver 26 as part of streaming channel bundle 30 (FIG. 1), client media receiver 26 need only alter the output signal provided to display device 28 (FIG. 1) to now depict the second channel stream, as indicated in FIG. 4 by the repositioning of graphic 106.

In the scenario of FIGS. 3-4 in which all applicable streaming channels are received concurrently, continuously, and at optimal quality, client media receiver 26 may function essentially as does a STB in a cable or satellite distribution system. However, the persistence of such idealized conditions under real world conditions cannot be ensured, particularly when streaming channel bundle 30 (FIG. 1) contains a relatively large number of channels. Thus, concurrent with changing the video output signal to streaming channel 2, client media receiver 26 may perform FUNCTION 80, as described above in conjunction with FIG. 2, and await additional channel change requests over the predetermined time threshold or channel change wait period. If no such channel change requests are received over this period, client media receiver 26 may then transmit a channel reprioritization command to streaming media server 22 indicating that streaming channel 2 should now be assigned the highest priority ranking as the newly-selected primary streaming channel. Additional changes in the priority rankings of the other streaming channels contained in streaming channel bundle 30 (FIG. 1) may also be adjusted; e.g., streaming channel 1 may be assigned a low or moderate priority level, as appropriate. In this manner, streaming media server 22 may reduce the quality of streaming channel 1 and the other secondary streaming channels in lieu of any degradation to the quality of streaming channel 2 should bandwidth constraints arise during continued transmission of streaming channel bundle 30.

Figure 5:
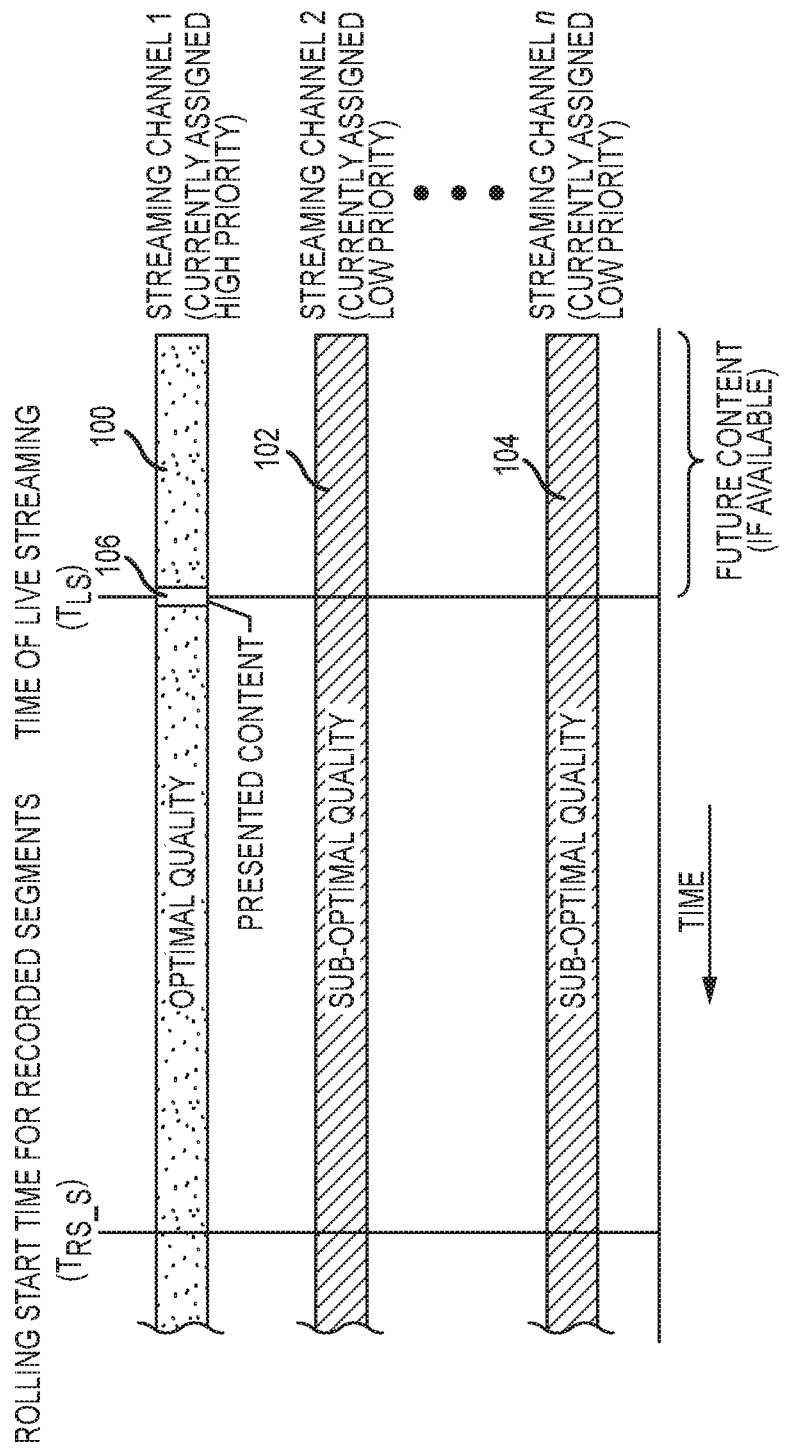

Advancing to FIG. 5, a second exemplary scenario is illustrated in which all applicable channels are received continuously, concurrently, and with varied quality levels. At this juncture of the exemplary scenario, a user channel change request has not yet been received at client media receiver 26. Streaming media server 22 encodes and transmits the primary streaming channel (here, streaming channel 1) in optimal quality, while providing some or all secondary streams (here, streaming channels 2-*n*) in sub-optimal quality; e.g., at a lower frame rate and/or image resolution to bring about a controlled reduction in the bitrate of the streamed content. As appearing herein, the term "sub-optimal quality" is utilized in a relative sense to denote some degree of intentional quality degradation relative to the optimal quality in which the streaming channels may otherwise be encoded and transmitted. Streaming channels provided in sub-optimal quality may thus still be perceived by an end user to be of relatively high visual quality and may different only modesty in image resolution, frame rate, and other such quality measurements.

Figure 6:
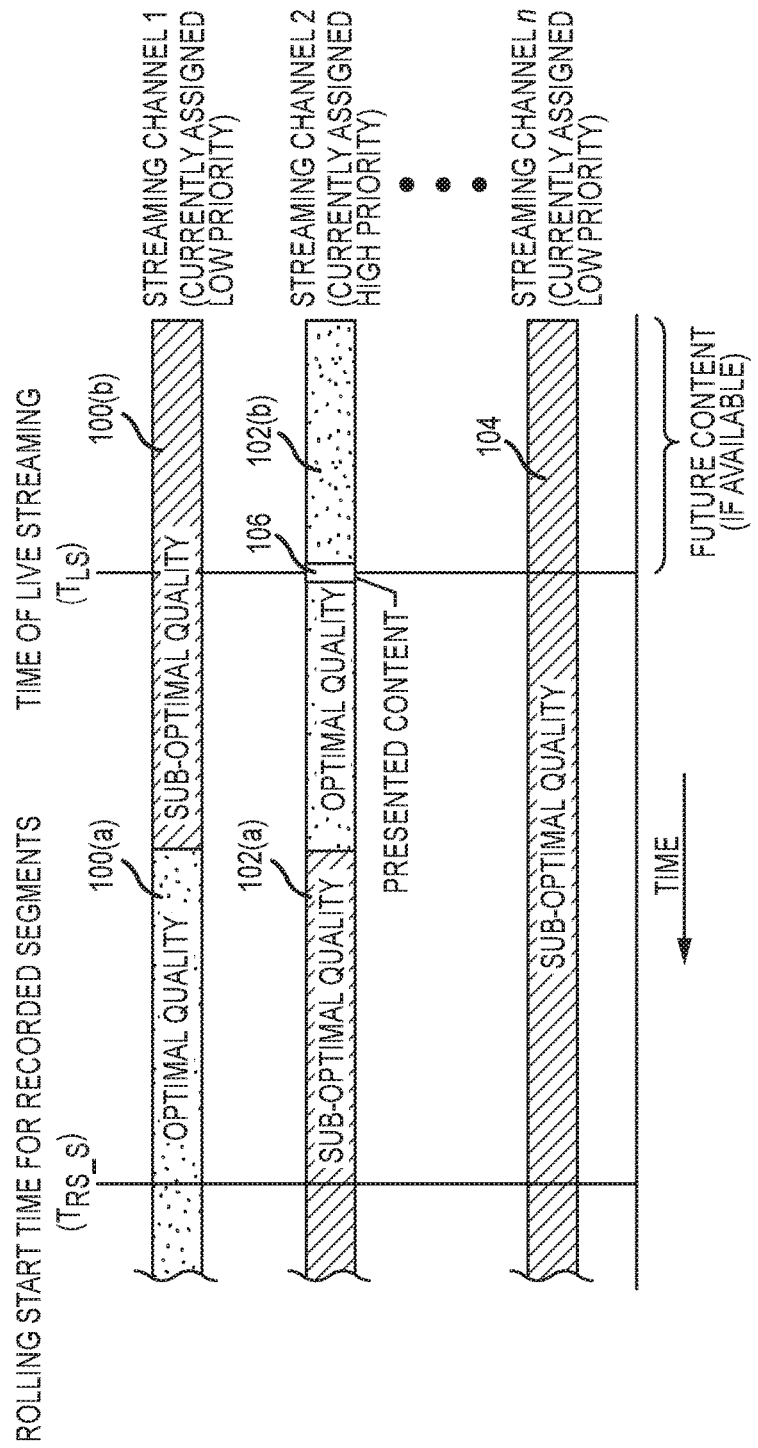

FIG. 6 illustrates the same exemplary scenario as does FIG. 5, but after receipt and implementation of a channel change request by client media receiver 26. The user channel change request indicates that a user desired to view streaming content from channel 2. Accordingly, as indicated by the repositioning of graphic 106, client media receiver 26 transitions to outputting streaming channel 2 to display device 28 (FIG. 1). As the streaming channel 2 is continuously provided over the relevant time period, a delay has not been introduced between the present time position of content outputted to display device 28 and $T_{LS}$. Client media receiver 26 further transmits a channel reprioritization command to streaming media server 22 (FIG. 1) indicating that streaming channel 2 is now properly identified as the primary streaming channel after elapse of the above-described channel change wait period, providing no other channel change requests are received within the wait period. Streaming media server 22 responds to the channel reprioritization command by prioritizing streaming channel 2 over streaming channel 1 and the other streamed secondary in continued transmission of bundle 30. Accordingly, streaming media server 22 will reduce the quality (and, perhaps, interrupt transmission of the secondary channels including streaming channel 1) before reducing the quality of the primary streaming channel (streaming channel 2) should bandwidth constraints arise necessitating such actions.

Streaming media server 22 performs appropriate adjustments encoding and transmission of streaming channel bundle 30 in response to receipt of the channel reprioritization command. For example, under the bandwidth constrained conditions of FIGS. 5-6, streaming media server 22 may transition from encoding and transmitting streaming channel 1 in optimal quality (as indicated by a first cross-hatch pattern for segment 100(*a*) of streaming channel 1) to providing streaming channel 1 in sub-optimal quality (as indicated by a second cross-hatch pattern for segment 100(*b*) of streaming channel 1). At essentially the same time, streaming media server 22 may also transition from encoding and transmitting streaming channel 2 in sub-optimal quality (as indicated by the first cross-hatch pattern for segment 102(*a*)) to now providing streaming channel 2 in optimal quality (as indicated by the second cross-hatch pattern for segment 102(*b*)). An analogous process can be performed if the user channel change request indicates that a different streaming channel, such as streaming channel n, is desirably presented on display device 28 (FIG. 1).

Figure 7:
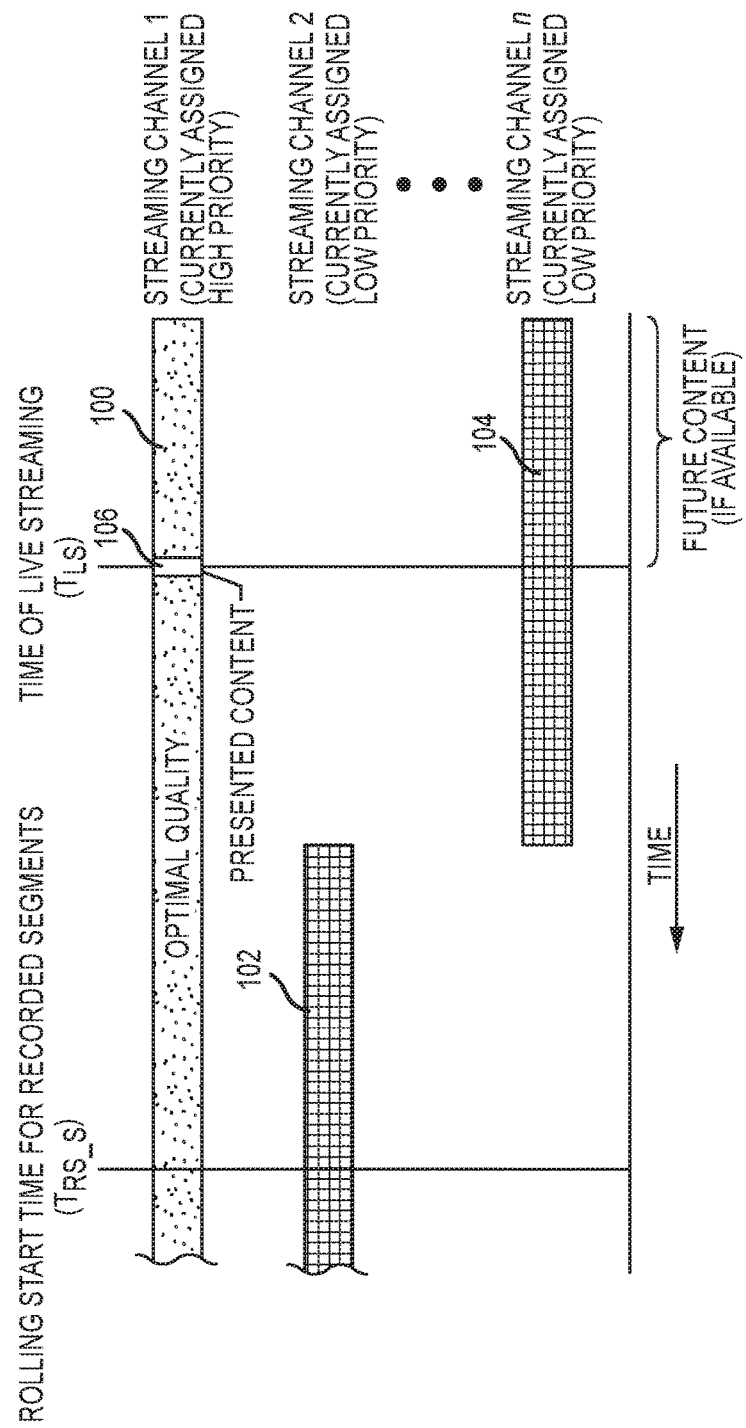
Figure 8:
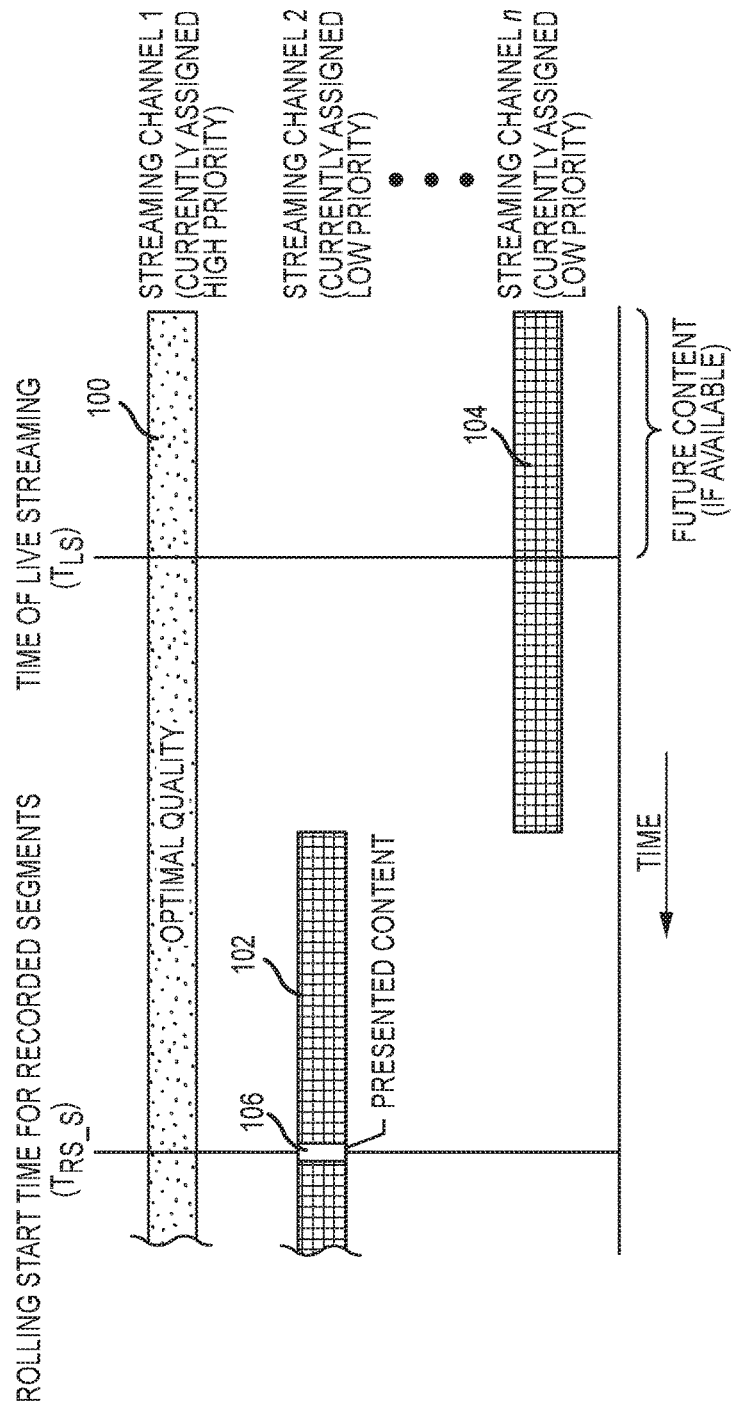
Figure 9:
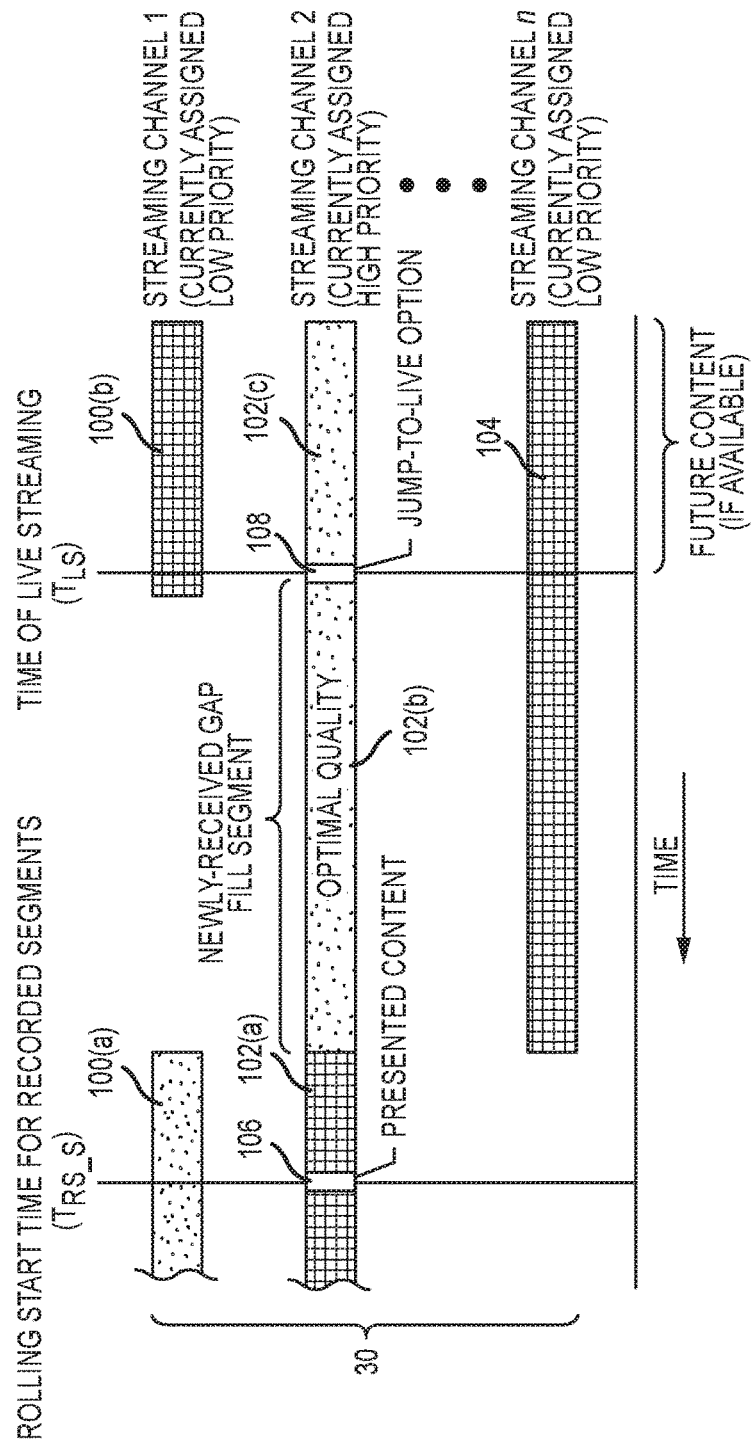

Turning lastly to FIGS. 7-9, a third exemplary scenario is presented in which streaming media sever 22 is prevented (e.g., due to bandwidth constraints) from encoding and transmitting all channels within streaming channel bundle 30 simultaneously, continuously, and at optimal quality levels. Under such conditions, streaming media server 22 may transmit selected secondary streams in an intermittent or non-continuous manner, whether at an optimal or suboptimal quality level (represented by a third cross-hatch pattern in FIGS. 7-9). In one embodiment wherein channel 1 is the primary stream, streaming media server 22 provides the secondary channels (e.g., channel 2 and channel n in FIG. 2) at an optimal quality level, but as a number of temporally-staggered segments. Client media receiver 22 may thus receive the primary streaming channel assigned the high priority ranking as a continual stream over a period of time, while concurrently receiving the plurality of other streaming channels assigned lower priority rankings as discontinuous streams over the period of time. In this manner, the overall bitrate of streaming channel bundle 30 can be lowered, while the end viewer may still be presented with any selected channel in optimal quality during channel browsing. Prior to the below-described channel change request, client media receiver 26 may output streaming channel 1 to display device 28 (FIG. 1) at an optimal quality and at a time position concurrent with $T_{LS}$.

With reference to FIG. 8, the illustrated scenario is depicted after entry of a user channel change request into client media receiver 26, but prior to reception of current streaming content corresponding to the newly-requested streaming channel. To avoid any discontinuity in presenting content to the viewer obtained from the newly-requested streaming channel to the end user, client media receiver 26 recalls the recently-recorded segment of the newly-requested streaming channel (in this example, streaming channel 2) from memory and outputs this streaming channel to display device 28. A delay or temporal lag in the time position of the content for streaming channel 2 is thus introduced relative to $T_{LS}$; however, the end user may be unaware of this time delay when browsing through the streaming channels and only temporarily viewing streaming channel 2 (and any other such channels through which the end user quickly browses) on a transitory basis. If, however, the end user does not issue further channel change requests prior to elapse of the above-described channel change wait period, client media receiver 26 may perform additional actions, as discussed in conjunction with FIG. 9.

FIG. 9 illustrates the third exemplary scenario at an instance or juncture following (e.g., several seconds after) the scenario of FIG. 8. As additional user channel change requests have not been received, client media receiver 26 transmits a channel reprioritization command to streaming media server 22 indicating that streaming channel 2 should now be assigned the highest priority ranking as the newly-selected primary stream. Correspondingly, streaming media server 22 updates streaming multichannel bundle 30 to contain streaming channel 2 as a continuous stream provided in optimal quality, absent severe bandwidth constraints. This is indicated in FIG. 9 by segments 102(b)-(c) of streaming channel 2. Client media receiver 26 has further requested, and streaming media server 22 has supplied, a historical gap fill segment 102(b) corresponding to streaming channel 2. This historical gap fill segment 102(b) is appended or joined to the end of the recorded segment of streaming channel 2 to ensure that continuity in the presentation of content from streaming channel 2. Content from the newly-selected streaming channel (channel 2) can thus be presented immediately upon user request, with the quality of the newly-selected streaming channel elevated at the earliest opportunity. As a corollary, a slight delay is introduced to the time position of the presented content, as indicated in FIG. 9 by the positioning of graphic 106. If desired, the end user may be presented with an option to progress the time position of the presented content to the time of live stream ($T_{LS}$), as indicated graphic 108. Such a "jump-to-live" option may be presented at any desired time and by, for example, visual prompts overlaid onto the video stream outputted to display device 28 (FIG. 1). Should the end user select this option, client media receiver 26 may then advance to the time of live streaming ($T_{LS}$), as indicated in FIG. 9.

There has thus been provided devices, systems, method, and program products enabling temporally-seamless change functionalities during multichannel (e.g., OTT linear TV) streaming sessions established between a streaming media server and a client media receiver. The foregoing processes can be implemented utilizing program products or software applications installed on and executed by an electronic device functioning as the client media receiver, such as a user-operated mobile phone. In certain embodiments, the streaming media server may be a STB located in a residence of an end user, in which case commands may be transmitted from the client media receiver to the set-top box to enable placeshifting of the prioritized streaming channel bundle for viewing at the client media receiver. Embodiments of the devices, systems, method, and program products may also favorably reduce the generation of unwarranted channel change request when an end user engages in prolonged channel browsing or channel surfing behaviors during a multichannel streaming session.

In embodiments, the foregoing methods may be carried-out by a client media receiver, which receives a prioritized streaming channel bundle from a streaming media server and selectively transmits channel reprioritization commands to the media server during the multichannel streaming session. The channel reprioritization commands may include information identifying the current priority ranking assigned to each of the streaming channels by the client media receiver. In this regard, the client media receiver may assign one or more of the streaming channels contained within the prioritized streaming channel bundle a high priority ranking, while further assigning a plurality of other streaming channels contained in the prioritized streaming channel bundle lower priority rankings. In certain cases, the client media receiver may assign an intermediate priority ranking to at least one streaming channel contained in the prioritized streaming channel bundle based, at least in part, upon a predicted likelihood of receiving a future user channel change request to view the at least one streaming channel; e.g., those channels frequently viewed by the end user and/or containing content similar to that presented on the primary streaming channel may be assigned intermediate priority rankings. As the multichannel streaming session is conducted, the streaming media server may selectively provide (and the client media receiver may receive) the lower priority streaming channels in reduced quality levels and/as discontinuous or intermittent streams to lower the bitrate of the streaming channel bundle and accommodate variations in network bandwidth.

While several exemplary embodiments have been presented in the foregoing Detailed Description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method carried-out by a client media receiver, comprising:

receiving, at the client media receiver, a prioritized streaming channel bundle transmitted over a communications network by a streaming media server;

outputting, to a display device associated with the client media receiver, a first streaming channel contained in the prioritized streaming channel bundle;

receiving, at the client media receiver, a user channel change request to view a second streaming channel contained in the prioritized streaming channel bundle;

monitoring, at the client media receiver, for an additional channel change request within a predetermined wait period commencing upon receipt of the user channel change request; and if an additional user channel change request is not received within the predetermined wait period, transmitting a channel reprioritization command to the streaming media server to prioritize the second streaming channel over the first streaming channel in continued transmission of the prioritized streaming channel bundle;

wherein, prior to elapse of the predetermined wait period: (i) the first streaming channel is assigned a higher priority ranking than is the second streaming channel, and (ii) the first streaming channel is received by the client media receiver at an optimal quality level, while the second streaming channel is concurrently received by the client media receiver at a reduced quality level.

2. The method of claim 1 further comprising repeating the step of monitoring if an additional user channel change request is received within the predetermined wait period.

3. The method of claim 1 further comprising receiving, at the client media receiver, the prioritized streaming channel bundle as over-the-top streaming television programming.

4. The method of claim 1 wherein the streaming media server comprises a set-top box located in a residence of an end user, and wherein the method further comprises transmitting commands from the client media receiver to the set-top box enabling placeshifting of the prioritized streaming channel bundle for viewing at the client media receiver.

5. The method of claim 1 further comprising, in response to receiving the user channel change request to view the second streaming channel, outputting to the display device:
a live stream of the second streaming channel if currently provided to the client media receiver as part of the prioritized streaming channel bundle transmitted over the communications network; and
a recorded segment of the second streaming channel if a live stream of the second streaming channel is not currently provided to the client media receiver.

6. The method of claim 5 wherein content from the second streaming channel is presented at a time position; and
wherein the method further comprises, when the time position of the second streaming channel is delayed relative to a time of live streaming due to presentation of the recorded segment, providing a user option to advance to the time of live streaming.

7. The method of claim 5 further comprising:
while outputting the recorded segment of the second streaming channel to the display device, awaiting receipt from the streaming media server of: (i) a live stream of the second streaming channel, and (ii) a historical gap fill segment for the second streaming channel extending from a time of live streaming to the conclusion of the recorded segment; and when receiving historical gap fill segment from the streaming media server, outputting the historical gap fill segment to the display device upon conclusion of the recorded segment.

8. The method of claim 5 further comprising:
storing the recorded segment of the second streaming channel in a memory accessible to the client media receiver; and
repeatedly updating the recorded segment to contain more timely content from the second streaming channel when second streaming channel is provided to the client media receiver, while limiting a length of the recorded segment to a predetermined duration.

9. A method carried-out by a client media receiver, comprising:
receiving, at the client media receiver, a prioritized streaming channel bundle transmitted from a streaming media server over a communications network;
outputting, to a display device associated with the client media receiver, a first streaming channel contained in the streaming channel bundle; and
when receiving, at the client media receiver, a user channel change request to view a second streaming channel contained in the prioritized streaming channel bundle, outputting to the display device:
a live stream of the second streaming channel if currently provided to the client media receiver as part of the prioritized streaming channel bundle;
a recorded segment of the second streaming channel if a live stream of the second streaming channel is not currently provided to the client media receiver; and
a historical gap fill segment for the second streaming channel received from the streaming media server and extending from a time of live streaming to the conclusion of the recorded segment, the client media receiver outputting historical gap fill segment to the display device upon conclusion of the recorded segment.

10. The method of claim 9 further comprising:
storing the recorded segment of the second streaming channel in a memory accessible to the client media receiver; and
repeatedly updating the recorded segment to contain more timely content from the second streaming channel when second streaming channel is provided to the client media receiver, while limiting a length of the recorded segment to a predetermined duration.

11. The method of claim 10 further comprising varying, at the client media receiver, the predetermined duration in response to changes in network latency of the communications network.

12. The method of claim 10 further comprises decreasing, at the client media receiver, the predetermined duration as a storage capacity of the memory is increasingly filled.

13. A method carried-out by a client media receiver, comprising:
receiving, at the client media receiver, a prioritized streaming channel bundle transmitted over a communications network by a streaming media server;
outputting, to a display device associated with the client media receiver, a first streaming channel contained in the prioritized streaming channel bundle;
receiving, at the client media receiver, a user channel change request to view a second streaming channel contained in the prioritized streaming channel bundle;

monitoring, at the client media receiver, for an additional channel change request within a predetermined wait period commencing upon receipt of the user channel change request; and if an additional user channel change request is not received within the predetermined wait period, transmitting a channel reprioritization command to the streaming media server to prioritize the second streaming channel over the first streaming channel in continued transmission of the prioritized streaming channel bundle;

wherein, prior to elapse of the predetermined wait period: (i) the first streaming channel is assigned a higher priority ranking than is the second streaming channel, and (ii) the first streaming channel is received by the client media receiver as a continuous stream, while the second streaming channel is concurrently received by the client media receiver as a discontinuous stream.

14. The method of claim 13 further comprising repeating the step of monitoring if an additional user channel change request is received within the predetermined wait period.

15. The method of claim 13 further comprising receiving, at the client media receiver, the prioritized streaming channel bundle as over-the-top streaming television programming.

16. The method of claim 13 wherein the streaming media server comprises a set-top box located in a residence of an end user, and wherein the method further comprises transmitting commands from the client media receiver to the set-top box enabling placeshifting of the prioritized streaming channel bundle for viewing at the client media receiver.

17. The method of claim 13 further comprising, in response to receiving the user channel change request to view the second streaming channel, outputting to the display device:

a live stream of the second streaming channel if currently provided to the client media receiver as part of the prioritized streaming channel bundle transmitted over the communications network; and a recorded segment of the second streaming channel if a live stream of the second streaming channel is not currently provided to the client media receiver.

18. The method of claim 17 wherein content from the second streaming channel is presented at a time position; and wherein the method further comprises, when the time position of the second streaming channel is delayed relative to a time of live streaming due to presentation of the recorded segment, providing a user option to advance to the time of live streaming.

19. The method of claim 17 further comprising:

while outputting the recorded segment of the second streaming channel to the display device, awaiting receipt from the streaming media server of: (i) a live stream of the second streaming channel, and (ii) a historical gap fill segment for the second streaming channel extending from a time of live streaming to the conclusion of the recorded segment; and when receiving historical gap fill segment from the streaming media server, outputting the historical gap fill segment to the display device upon conclusion of the recorded segment.

20. The method of claim 17 further comprising:

storing the recorded segment of the second streaming channel in a memory accessible to the client media receiver; and repeatedly updating the recorded segment to contain more timely content from the second streaming channel when second streaming channel is provided to the client media receiver, while limiting a length of the recorded segment to a predetermined duration.

* * * * *